United States Patent [19]

Grynkewich

[11] 4,428,915

[45] Jan. 31, 1984

[54] PROCESS FOR RECOVERING PHOSPHATE VALUES FROM PRECIPITATES FORMED DURING THE NEUTRALIZATION OF IMPURE WET PROCESS PHOSPHORIC ACID

[75] Inventor: Gregory W. Grynkewich, West Haven, Conn.

[73] Assignee: Olin Corporation, New Haven, Conn.

[21] Appl. No.: 436,225

[22] Filed: Oct. 25, 1982

[51] Int. Cl.³ .......................................... C01B 25/30
[52] U.S. Cl. ................................. 423/312; 423/122; 423/167; 423/305; 423/308; 423/315
[58] Field of Search .................... 423/112, 122, 321 S, 423/312, 308, 315, 305, 167

[56] References Cited

U.S. PATENT DOCUMENTS

| | | | |
|---|---|---|---|
| 453,300 | 6/1891 | Glaser | 423/122 |
| 1,929,443 | 10/1933 | Milligan | 423/321 S |
| 3,118,730 | 1/1964 | Nickerson | 423/320 |
| 3,545,920 | 12/1970 | George et al. | 423/112 |
| 3,862,298 | 1/1975 | Beltz et al. | 423/321 S |
| 4,053,564 | 10/1977 | Bradford | 423/112 |

OTHER PUBLICATIONS

Chemical Abstracts 74(6), 27608v.
Chemical Abstracts 77(4), 25452b.
Kirk-Othmer; *Encyclopedia of Chemical Technology*, Third Edition, vol. 5, "Chelating Agents", pp. 339–368. (1979).
Noyes, Robert; *Phosphoric Acid by the Wet Process*, 1967, Noyes Development Corporation, p. 240.

*Primary Examiner*—Edward J. Meros
*Assistant Examiner*—Wayne A. Langel
*Attorney, Agent, or Firm*—William A. Simmons; Thomas P. O'Day

[57] ABSTRACT

Disclosed is a process for recovering phosphate ($P_2O_5$) values from solid iron- and aluminum-containing precipitates (muds) formed during the neutralization of impure wet process phosphoric acid with one or more sodium compounds, comprisig:
(a) treating said solid iron- and aluminum- containing precipitates with an aqueous solution containing a sodium compound and having a pH in the range from about 10 to about 13 for sufficient amount of time to extract at least a portion of phosphate and aluminum values contained in said precipitates and thereby form a sodium phosphate solution which contains aluminum values;
(b) separating the sodium phosphate solution from the solid precipitates;
(c) treating the separated sodium phosphate-containing solution with a sufficient amount of a chelant selected from di(lower alkyl) betadiketones of the formula

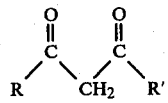

wherein R and R' are individualy selected from lower alkyul groups having 1 to 4 carbon atoms to form and to precipitate a metal chelate complex containing at least a portion of said aluminum values present in solution;
(d) separating the precipitated metal chelate complex from the sodium phosphate solution; and
(e) recovering phosphate values (e.g. in the form of disodium phosphate, trisodium phosphate, and sodium tripolyphosphate) from the solution.

11 Claims, 1 Drawing Figure

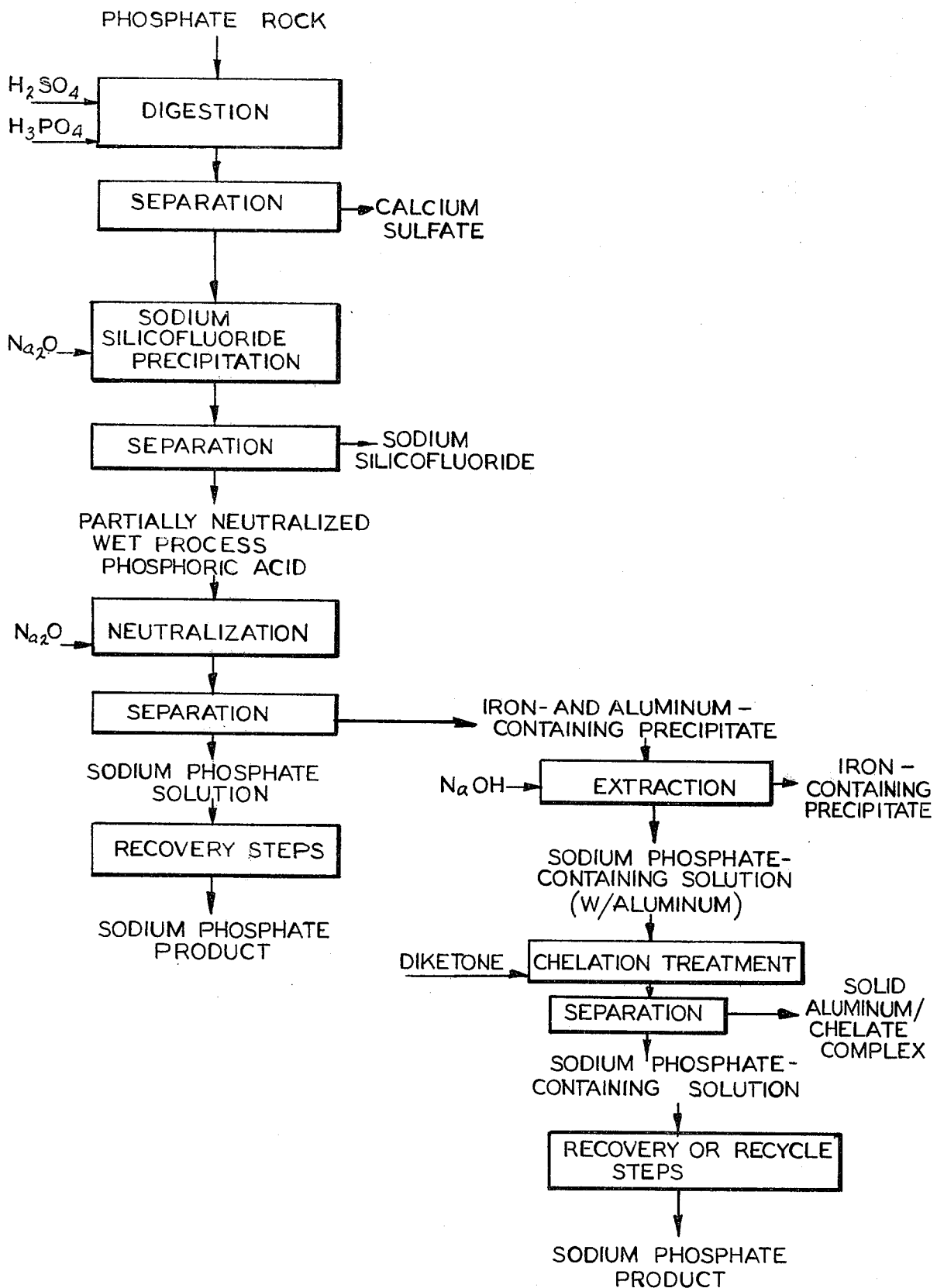

PROCESS FOR RECOVERING PHOSPHATE VALUES FROM PRECIPITATES FORMED DURING THE NEUTRALIZATION OF IMPURE WET PROCESS PHOSPHORIC ACID

BACKGROUND OF THE INVENTION

1. Field of the Invention

The present invention relates to an improved process for making sodium phosphates (e.g. disodium phosphate, trisodium phosphate and sodium tripolyphosphate). More specifically, it relates to the recovery of phosphate ($P_2O_5$) values from the solid precipitate (muds) formed by the neutralization of impure wet process phosphoric acid with a sodium compound.

2. Brief Description of Prior Art

One method for making phosphoric acid today is by the so-called wet process. By this process phosphate rock is first digested with a mineral acid, usually sulfuric acid, phosphoric acid, or combinations of the two, which results in the precipitation of calcium values from the rock and the release of an impure phosphoric acid solution. This impure acid solution is relatively high in impurities, including silica, iron and aluminum. The silica is usually then removed as a sodium silicofluoride precipitate by addition of a small amount of sodium hydroxide or sodium carbonate.

In the course of making sodium phosphates, the impure, partially neutralized phosphoric acid (after removal of the calcium and silica) is further neutralized, normally by addition of more sodium hydroxide or carbonate, to form a monosodium phosphate solution. During this neutralization step, a major portion (at least about 50% by weight) of both the undesirable iron and aluminum impurities are precipitated from the solution. While the resulting monosodium phosphate solution is substantially pure, the iron- and aluminum-containing precipitates have therein a relatively large amount of phosphate values, thus reducing the overall yield of the process. Typically, about 5% to about 15% by weight of the total $P_2O_5$ values of the phosphate rock are present in these precipitates or muds.

The recovery of such $P_2O_5$ values from these muds is not easy. Extraction of the $P_2O_5$ values with an aqueous sodium carbonate or sodium hydroxide solution results in the co-extraction of the aluminum values (the iron values are left in the muds). Until the present invention, the co-extraction of the aluminum was undesirable since it had to ultimately be either re-precipitated as a phosphate, thereby reducing the overall efficiency of the extraction process, or had to be contained in the final product, thereby reducing product purity and, possibly, the performance of the product.

Accordingly, there is a need to improve this extraction of muds to prevent the carry through of aluminum values with the phosphate values. The present invention offers a solution to this need.

BRIEF SUMMARY OF THE INVENTION

The present invention, therefore, is directed to a process for recovering phosphate values from solid iron- and aluminum-containing precipitates formed during the neutralization of impure wet process phosphoric acid with a sodium compound which comprises:

(a) treating the solid iron- and aluminum-containing precipitates with an aqueous solution containing a sodium compound and having a pH in the range from about 10 to about 13 for sufficient amount of time to extract at least a portion of phosphate and aluminum values contained in the precipitates and thereby form a sodium phosphate solution which contains aluminum values;

(b) separating the sodium phosphate solution from said solid precipitates;

(c) treating the separated sodium phosphate solution with a sufficient amount of a chelant selected from di(lower alkyl) beta-diketones of the formula (I):

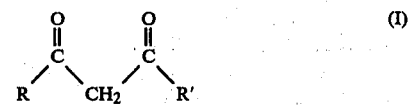

wherein R and R' are individually selected from lower alkyl groups having 1 to 4 carbon atoms to form and to precipitate a metal chelate complex containing at least a portion of said aluminum values present in solution;

(d) separating the precipitated metal chelate complex from the sodium phosphate solution; and (e) recovering phosphate values (e.g. in the form of disodium phosphate, trisodium phosphate, and sodium tripolyphosphate) from the sodium phosphate solution.

BRIEF DESCRIPTION OF THE DRAWING

The drawing represents a flow chart for a preferred embodiment of the present invention.

DETAILED DESCRIPTION

Referring to the Drawing, one preferred embodiment involves natural phosphate rock or ore being digested with a mineral acid in an aqueous solution to form an impure phosphoric acid solution. Preferably, the rock has been ground and calcined to burn off any organic impurities. Normally, rock having at least 70% by weight BPL is preferred; but high quality rock is getting scarce. Calcined rock still contains calcium, silica, iron and aluminum impurities as well as others.

The rock is digested with one or more mineral acids in one or more stages (e.g. in tanks). Preferably, the ground, calcined rock is first mixed in a weak recycled $H_3PO_4$ solution (e.g. about 15% to about 25% by weight $P_2O_5$) wherein a slurry is obtained. Next, it is preferred to add a sulfuric acid solution (e.g. containing about 75% to 85% by weight $H_2SO_4$) to this rock slurry whereby most of the desired phosphoric acid formation takes place. The use of multiple digesters in series is desirable to aid in cooling the very exothermic reaction between the rock and the $H_2SO_4$. Also, the successive holding times of multiple digesters allows for the building of good crystal structure of the calcium sulfate by-product (i.e. gypsum or hemihydrate forms of $CaSO_4$). Beside this by-product, various amounts of many rock impurities are present in the impure acid solution. These include silicon, fluoride, iron and aluminum compounds.

The calcium sulfate by-product, preferably gypsum, is then separated from the impure phosphoric acid solution. This separation may be carried out by filtration or the like. Vacuum filtration is one preferred method of separation. However, any conventional technique may be employed for this separation. The separated gypsum or the like is transferred to ponds or the like for disposal or use as raw material in other products.

The $P_2O_5$ content of the impure phosphoric acid solutions which may be employed in the present invention is preferably in the range from about 15% to about 35% by weight or greater. A good description of how wet process phosphoric acid is made is provided by Waggman W. H., *Phosphoric Acid, Phosphates and Phosphatic Fertilizers*, 2nd Edition, Chapter 12, Reinhold Publishing Company, New York (1952). That chapter of Waggman is incorporated herein by reference in its entirety.

After removal of the calcium sulfate by-product, the resulting impure acid solution (sometimes called green $H_3PO_4$) contains a number of impurities. This solution is then reacted with a sodium compound (usually $Na_2CO_3$ or NaOH) at ambient temperature until the Na/P molar ratio is from about 0.2:1 to about 0.4:1 (with a pH of about 2) is achieved. This causes the silicon- and fluoride-containing impurities to precipitate out as $Na_2SiF_6$. These precipitates are allowed to settle out, separated by conventional means such as filtration, washed and dried. The $Na_2SiF_6$ may be sold for water purification purposes or reacted with NaOH to form NaF, which is a good fluxing agent. The resulting impure, partially neutralized phosphoric acid solution still contains large amounts of soluble iron- and aluminum containing impurities, but may be made into various useful sodium phosphate products.

Such products are normally made by first adding more sodium compound (e.g. sodium carbonate, sodium hydroxide or both) to further neutralize the impure acid solution. The resultant pH of this neutralized solution is from about 4 to about 5, depending upon the amount of sodium compound used. The Na/P molar ratio is at least about 1.0/1.0. This neutralization also causes the precipitation of many impurities (muds) such as iron phosphates and aluminum phosphates. These muds are filtered from the neutralized solution or otherwise separated. In the past, the muds were dried and sold as a fertilizer for their phosphate content. The price was not high, but this use offered a means of disposing of these waste products.

If crystalline monosodium phosphate (MSP) product was desired, the amount of sodium compound added to the acid solution was just enough to obtain a Na/P molar ratio of about 1:1. After filtration of the muds, the resultant solution was preferably subjected to a vacuum crystallization step to form the MSP product. This product has an acid pH (about 4.6) and may be sold as a commercial product as an acid salt or for metal cleaning. Also, the crystalline MSP product may be converted by low temperature heating into sodium acid pyrophosphate (SAPP) or converted by high temperature heating into sodium polyphosphate $(NaPO_3)_x$. The latter product is a glossy material which has utility in water treatment.

Further neutralization of the solution (i.e. to a Na/P molar ratio of about 2:1) with more $Na_2CO_3$ or NaOH will result in the formation of a disodium phosphate (DSP) solution. Disodium phosphate may be recovered from the solution and used as a detergent builder. The DSP may also be converted into tetrasodium pyrophosphate (TSPP). The reaction of 1 mole of MSP with 2 moles of DSP results in the formation of sodium tripolyphosphate (STPP), which is also a builder in detergents.

It should be noted that the present invention is principally concerned with recovering phosphate values from the iron- and aluminum-containing muds made during the neutralization of an impure acid solution. Accordingly, the above-noted rock digestion step, calcium sulfate and silicon removal steps, the neutralization step, and sodium phosphate product recovery steps, as well as parameters thereof, are not critical to the present invention and any conventional method of carrying out such steps may be employed. The preferred treatment of these muds is described as follows.

First, these muds are mixed with an aqueous solution containing either sodium hydroxide, sodium carbonate, or combinations thereof. Sodium hydroxide is the most preferred. The resulting aqueous mixture should have a pH from about 10 and about 13, more preferably from about 12 to about 13. The pH has to be high enough to extract at least a portion of the phosphate values from the muds. Unfortunately, as explained above, at least a portion of the undesired aluminum values will be co-extracted. More preferably, it is desired to carry out this extraction at elevated temperature (e.g. from about 30° C. to about 60° C. or higher) and for sufficient time (e.g. from about 0.25 hours to about 4 hours or longer) to extract at least a major portion (i.e. at least 50% by weight) of the phosphate values present in the muds.

After the desired amount of extraction has been completed, the extraction liquid containing soluble phosphate and aluminum values is separated from the remaining solid muds, preferably by filtration. The separated iron-containing muds, which now are depleted in $P_2O_5$ values, may be discarded. The resulting extraction liquid or filtrate may, in normal operation, contain about 40 to about 85% by weight of the $P_2O_5$ values originally present in the muds as well as about 30 to about 95% of the aluminum originally present in the muds.

The separated extraction liquid is then treated with a sufficient amount of a di(lower alkyl) beta-diketone chelant as described above to form and to precipitate a metal chelate complex with at least a portion of the aluminum values present in the filtrate.

Any di(lower alkyl) beta-diketone may be used which forms stable, insoluble complexes with aluminum in the presence of phosphate $[PO_4^{-3}]$ ions. The preferred di(lower alkyl) beta-diketone is dimethyl beta-diketone, also known as 2,4-pentanedione or acetylacetone (Hacac). The amount of the beta-diketone used depends upon the concentration of aluminum in the sodium hydroxide extraction liquid or filtrate. Alternatively, sodium salts of these chelants may be used instead of the free acid forms. For best results, at least a stoichiometric amount (i.e. the amount that will react with the Al) of the chelant may be used. For example, when dimethyl beta-diketone is employed as the chelant, at least about a 3:1 molar ratio of it to $Al^{+3}$ should be employed since the resulting metal chelant complex is $Al(C_5H_7O_2)_3$. Amounts less than stoichiometric will remove less aluminum. Amounts in excess of stoichiometric amounts may result in a waste of the chelant and a residual amount of the chelant in the sodium phosphate product or in processing streams, or both.

The precipitated aluminum chelate complex is then removed by filtration or other suitable solid/liquid separation means. The chelate values may then be recovered from the complex by dissolution of the complex in an aqueous acidic solution and then distilling off the chelating agent. Alternatively, the aluminum chelate complex may be used as a catalyst in other processes.

The separated sodium phosphate-containing solution, now depleted of aluminum values, may be either treated in any conventional matter to recover the phosphate values therefrom or combined with neutralized sodium phosphate solution of the main process and treated therewith.

Generally, it is believed that the process of this invention will reduce the concentration of undesirable aluminum which is co-extracted with the $P_2O_5$ values by a factor of about 10 to about 100, resulting in a much more efficient and practical extraction process and in significantly increased overall plant yields of $P_2O_5$ values.

The following example further illustrates the present invention. All parts and percentages are by weight unless explicitly stated otherwise.

EXAMPLE 1

An iron and aluminum-containing precipitate (100 grams) produced by the neutralization of wet process phosphoric acid (which was previously clarified of gypsum and sodium silicofluoride) was slurried with distilled water (100 grams). The composition of the precipitate is given in Table 1 and the pH of the grey-colored slurry was measured to be 6.0.

To this slurry, NaOH (30 grams, aqueous solution of 50% by weight NaOH) was added. The pH of the slurry was then measured to be 12.8 and the color of the slurry changed to dark red-brown.

After stirring this slurry for 2 hours at ambient temperature (about 20°–25° C.), the slurry was suction filtered on a Buchner funnel, yielding 135.63 grams of a filtrate and 93.00 g wet red-colored, iron-containing solids. The composition of this first filtrate was analyzed and is shown in Table 2 as Filtrate A.

A portion of this first filtrate (75.40 grams) was treated with acetylacetone (8.0 grams). Upon addition of the acetylacetone, an off white-colored precipitate formed immediately. After stirring for 15 minutes, the pH of this mixture was measured to be 9.1 and then filtered yielding 78.13 grams of a filtrate and 2.77 grams of a cream-colored aluminum-containing solids. The composition of this second filtrate was analyzed and is shown in Table 2 as Filtrate B.

A portion of this second filtrate (25 grams) was treated with benzene (10 grams). This mixture was stirred vigorously and phase separated. Activated charcoal (1 gram) was then added to the aqueous phase and the mixture was stirred again and filtered, yielding a filtrate (21.58 grams) and black solids. The composition of this third filtrate was analyzed and is shown in Table 2 as Filtrate C.

The cream colored solids were identified as Al(acac)$_3$ by melting point and C, H, and Al analysis (Theory for $C_{15}H_{21}O_6Al$: C, 55,55%; H, 6.53%; Al, 8.32%. Found: C, 55.43%; H, 6.37%; Al, 7.4%)

As can be seen from the data presented in Table 2, the undesirable aluminum content of a phosphate containing solution made from mud-like by-products of a alkali metal phosphate process may be significantly lowered by the use of a diketone chelating agent with little reduction of desirable $P_2O_5$ and sodium contents.

TABLE 1

| Metal Phosphate Precipitate Analysis | | |
|---|---|---|
| | wt % | |
| | Wet | Dry |
| $P_2O_5$ | 15.98 | 40.20 |
| Mg | 0.33 | 0.84 |
| Ca | 1.37 | 3.50 |
| Al | 1.49 | 3.80 |
| Fe | 3.19 | 8.03 |

TABLE 1-continued

| Metal Phosphate Precipitate Analysis | | |
|---|---|---|
| | wt % | |
| | Wet | Dry |
| Na | 3.68 | 9.25 |

TABLE 2

| | Analytical Results | | |
|---|---|---|---|
| | wt % | | |
| | Filtrate A | Filtrate B | Filtrate C |
| $P_2O_5$ | 2.3 | 2.2 | 2.1 |
| Na | 2.5 | 2.3 | 2.3 |
| Fe | <0.0015 | <0.0015 | <0.0015 |
| Al | 0.40 | .045 | 0.0040 |

What is claimed is:

1. A process for recovering phosphate ($P_2O_5$) values from solid iron- and aluminum-containing precipitates formed during the neutralization of impure wet process phosphoric acid with a sodium compound which comprises:
    (a) treating said solid iron- and aluminum-containing precipitates with an aqueous solution containing a sodium compound and having a pH in the range from about 10 to about 13 for sufficient amount of time to extract at least a portion of phosphate and aluminum values contained in said precipitates and thereby forming a sodium phosphate solution which contains aluminum values;
    (b) separating said sodium phosphate solution from said solid precipitates;
    (c) treating said separated sodium phosphate solution with a sufficient amount of a chelant selected from the group consisting of di(lower alkyl) beta-diketones of the formula:

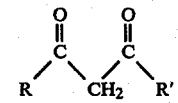

wherein R and R' are individually selected from lower alkyl groups having 1 to 4 carbon atoms to form and to precipitate a metal chelate complex containing at least a portion of said aluminum values present in solution;
    (d) separating said precipitated metal chelate complex from said sodium phosphate solution; and
    (e) recovering phosphate values from said sodium phosphate solution.

2. The process of claim 1 wherein said R and R' groups of the formula in step (c) are both methyl.

3. The process of claim 1 wherein separation steps (b) and (d) are carried out by filtration.

4. The process of claim 1 wherein the sodium compound employed in step (a) is sodium hydroxide.

5. The process of claim 1 wherein a stoichiometric amount of said chelant is added to react with the aluminum present in said separated sodium phosphate solution.

6. In the process for preparing a sodium phosphate product from phosphate rock containing iron, aluminum, silica and calcium values therein comprising:
    (a) digesting said phosphate rock with a mineral acid selected from the group consisting of phosphoric acid, sulfuric acid, and combinations thereof, to form an impure phosphoric acid solution containing iron, aluminum and silica values and calcium-containing precipitates;

(b) separating said calcium-containing precipitates from said impure phosphoric acid solution;

(c) adding a sufficient amount of a sodium compound to said impure phosphoric acid solution so as to partially neutralize said acid solution and to precipitate at least a portion of the silica values therein as sodium silicofluoride, the resulting mole ratio of Na:P in said partially neutralized solution not being greater than about 0.4:1;

(d) separating said precipitated sodium silicofluoride from said partly neutralized phosphoric acid solution;

(e) then adding a sufficient amount of a sodium compound selected from the group consisting of sodium hydroxide and sodium carbonate to form a sodium phosphate-containing solution and to precipitate at least a portion of said iron and aluminum values;

(f) separating said iron- and aluminum-containing precipitates from said sodium phosphate-containing solution; and (g) recovering phosphate values from said sodium phosphate-containing solution;

wherein the improvement comprises:

(h) treating said iron- and aluminum-containing solid precipitates with an aqueous solution containing a sodium compound and having a pH in the range from about 10 to about 13 for sufficient amount of time to extract at least a portion of phosphate and aluminum values contained in said precipitates and thereby forming a sodium phosphate solution which contains aluminum values;

(i) separating said sodium phosphate solution from said solid precipitates;

(j) treating said separated sodium phosphate-containing solution with a sufficient amount of a chelant selected from the group consisting of di(lower alkyl) beta-diketones of the formula:

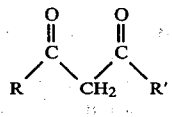

wherein R and R' are individually selected from lower alkyl groups having 1 to 4 carbon atoms to form and to precipitate a metal chelate complex containing at least a portion of said aluminum values present in solution;

(k) separating said precipitated metal chelate complex from said sodium phosphate solution; and (l) recovering phosphate values from said sodium phosphate solution.

7. The process of claim 6 wherein said R and R' of the Formula in step (j) are both methyl.

8. The process of claim 7 wherein a stoichiometric amount of said chelant is added to react with the aluminum present in said separated sodium phosphate solution.

9. The process for removing aluminum values from a phosphate-containing solution, which comprises:

(a) treating a phosphate solution containing soluble aluminum values with a sufficient amount of a chelant selected from the group consisting of di(lower alkyl) beta-diketones of the formula:

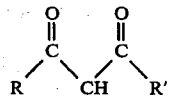

wherein R and R' are individually selected from lower alkyl groups having 1 to 4 carbon atoms to form and to precipitate a metal chelate complex containing at least a portion of said aluminum values present in said solution; and (b) separating said precipitated metal chelate complex from said phosphate solution.

10. The process of claim 9 wherein said R and R' of the Formula in step (a) are both methyl.

11. The process of claim 10 wherein a stoichiometric amount of said chelant is added to react with the aluminum present in said phosphate solution.

* * * * *